E. Webster. Sheet 1. 2 Sheets.

Hot-air Furnace.

No. 3340. Reissued Mar. 23. 1869.

Witnesses:

Albert H. Olds

Jerry W. Byrs.

Inventor:

Edward Webster

Assignor to

Allen & Willard

E. Webster. Sheet 2. 2 Sheets.
Hot-air Furnace.
No. 3340. Reissued Mar. 23. 1869.
Fig. 2.
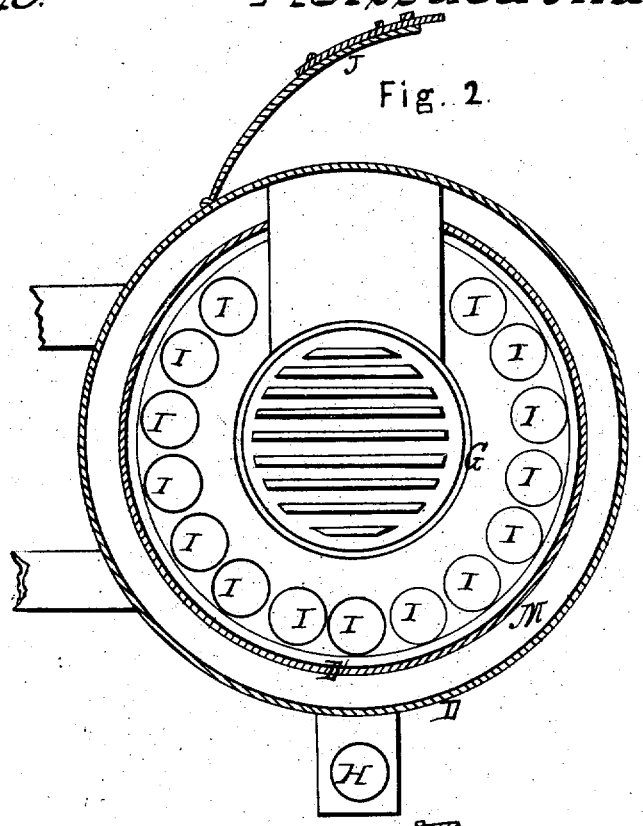
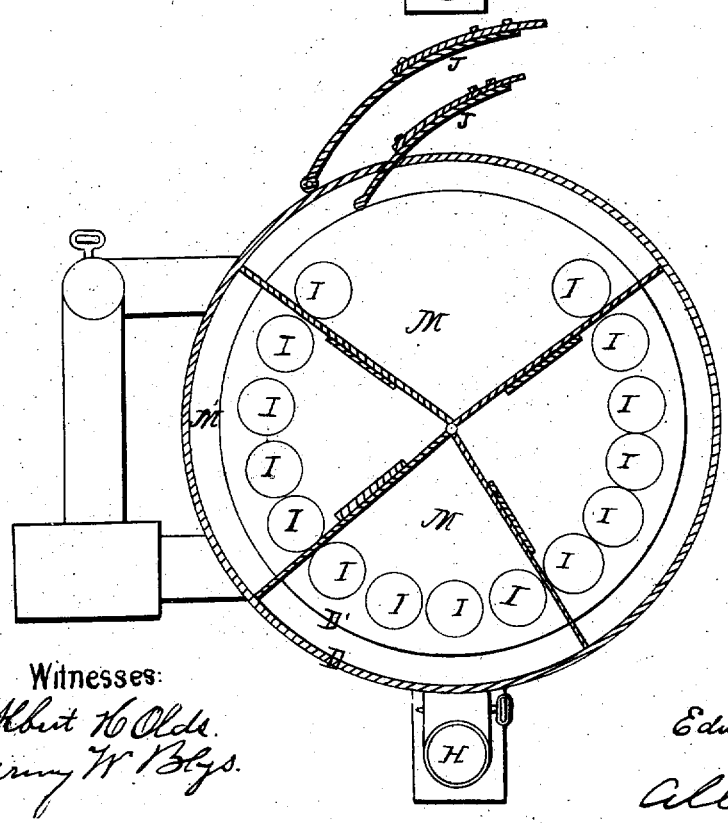
Witnesses:
Albert H. Olds.
Jerry W. Bigs.
Inventor:
Edward Webster
Assignor to
Allen & Willard.

United States Patent Office.

ALLEN AND WILLARD, OF HARTFORD, CONNECTICUT, ASSIGNEES OF EDWARD WEBSTER.

*Letters Patent No.* 55,564, *dated June* 12, 1866; *reissue No.* 3,340, *dated March* 23, 1869.

HOT-AIR FURNACE.

The Schedule referred to in these Letters Patent and making part of the same.

*To all whom it may concern:*

Be it known that EDWARD WEBSTER, of the city and county of Hartford, and State of Connecticut, has invented certain new and useful Improvements in Hot-Air Furnace; and in order to enable others skilled in the art to make and use the same, we will proceed to describe its construction and operation, referring to the drawings, in which the same letters indicate like parts in each of the figures.

The manner of shaping, or forming and putting together of the several parts, is produced or accomplished very much in the common way.

The nature of this invention consists in forming the combustion-chamber of a series of air-conducting tubes, nearly around the fire-pot and the inner wall of the furnace, said chamber being closed from the outer space by said inner wall and the top and bottom plates, so that the heat shall diffuse and expend itself upon the entire surface within the chamber, while the smoke passes off, or is drawn off through the exit-orifice, formed in, or nearly in the centre of the bottom plate, directly under the fire-pot, or ash-box.

It further consists of a deflecting-plate, arranged around, at, or near the bottom of the fire-pot, or ash-box, for the purpose of closing the space, or opening between the fire-pot and the inner wall of the furnace, except a narrow draught-opening, between the inner wall and the outer edge of said deflecting-plate.

In other words, it consists in closing up the space around the fire-pot, and nearly to the inside surface of the inner wall, allowing only sufficient space between the outer edge of said deflecting-plate and tubes and the inner wall, to allow a full and free draught of the smoke and unexpended heat to pass down over and between the outer edge of the deflecting-plate and the inner wall, by means of which (the deflecting-plate) a draught and heat-space is produced under the furnace, and a smoke-exit formed under and nearly in the centre of the furnace, thus causing the heat to diffuse and expend itself upon the whole internal surface of the combustion-chamber, and causing the smoke to escape through an orifice in or near the centre of the under side, or bottom of the furnace, or combustion-chamber.

In the accompanying drawings—

Figure 2 is a partial section view, cut just above the fire-grate.

Figure 3 is a plan view, taken just above the upper ends of the air-tubes or the combustion-chamber.

Figure 1:
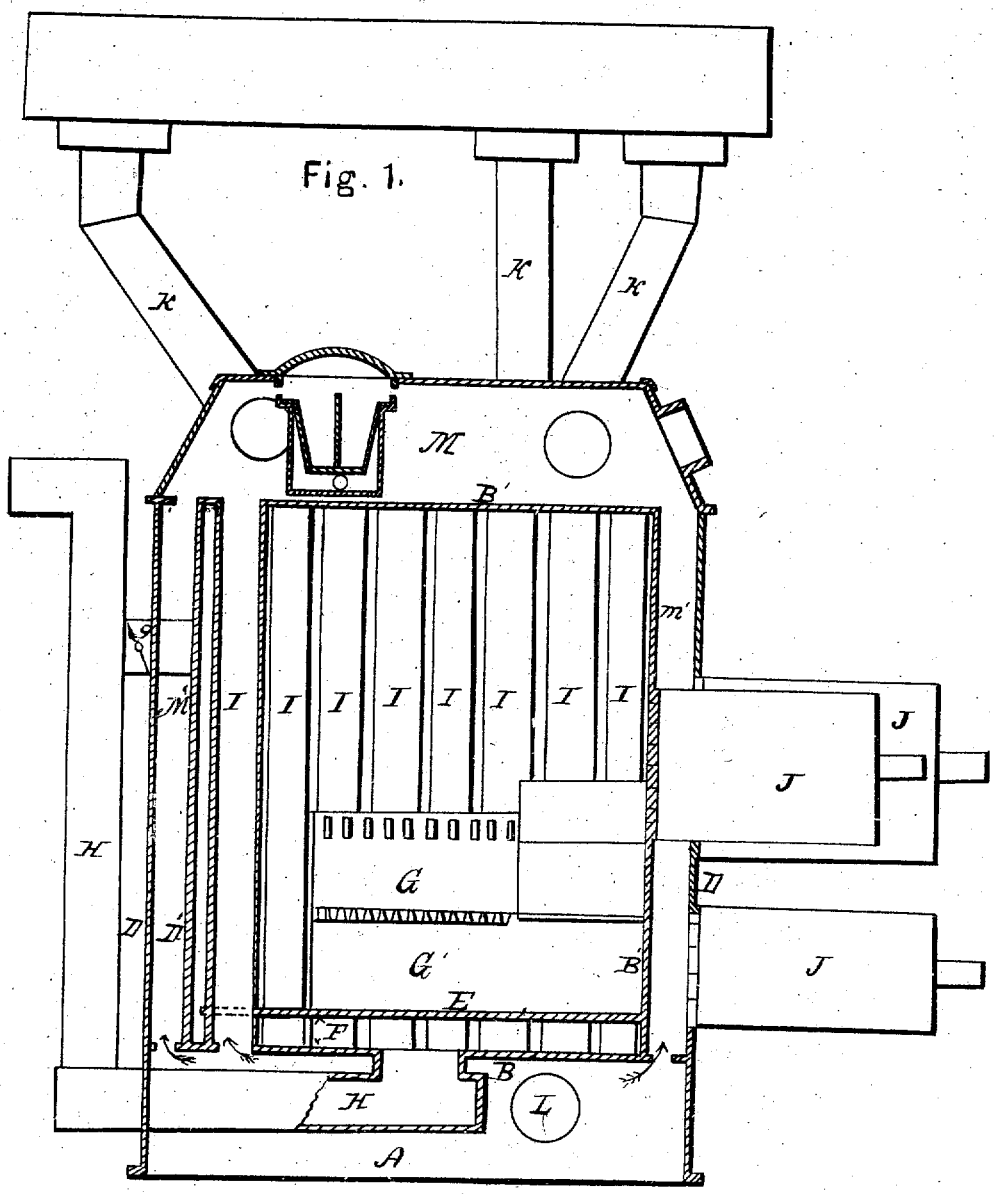
Figure 1 is a sectional side elevation.

A is the base, or air-space.

L is an opening for admitting air into the chamber A.

B is the bottom of the furnace, directly over the air-box, and is provided with a draught, or exit-orifice, C, arranged in or near the centre of the plate B.

B′ is the head, or top plate of the combustion-chamber.

D is the outer wall, or body of the furnace.

This wall is sometimes formed of masonry, and sometimes of metal, as may be desirable.

D′ is an inner wall, which encloses the fire-pot and air-conducting tubes, I, the upper and lower ends of which unite with the top and bottom plates B B′, and form the combustion-chamber.

E is a deflecting-plate, which serves to close the space around the fire-pot, and nearly to the side of the inner wall of the furnace, allowing only sufficient space, between the outer edge of said plate and the inner wall, to allow a full and free draught, by means of which an equalized draught and space, E, between the plates E and B, is produced, so that the heat will diffuse and expend itself upon all of the internal surface of the combustion-chamber, diffusing itself in all directions, and, in its course, descends over the outer edge of the deflecting-plate, and still expends its unexhausted property upon the surface of the space F, while the smoke escapes through the central orifice C, underneath the furnace, or fire-pot, in the pipe H, formed in the air-chamber, or box A.

M′ is a space between the inner and outer wall, D D′, for the circulation of air, and serves to retain the entire heat inside of the outer wall D.

This space is designed to be opened or closed, as desirable, in its communication upward, through the plate B′.

M is the hot-air chamber, at the upper end of the furnace, from which the air is conducted to the several apartments, by pipes K, in the usual way.

The fire-pot G, the feed and draught-openings J J, and dampers, are all constructed in the common way.

S is the direct draught from the combustion-chamber to the smoke-pipe H, which is opened and closed at will, by means of a damper, such as is in common use, and is particularly useful while kindling fire in the furnace.

The space F is formed between the under side of the ash-box G′ and the air-chamber A, and is designed to take up or exhaust the heat of the fire, and allow and form a free passage for the smoke to the exit-orifice, or central exit, C, thence, through the air-box A, into the pipe H.

Now, it will be seen that the whole outer surface of the tubes I, through which the air passes, and the inner surface of the plates B B′ and the wall D′, are exposed to the heat, while the atmospheric air is allowed free circulation, through the tubes I and spaces F and M′, into the hot air-chamber M, so, that while the smoke passes off through the exit C, the heat will be expended upon the exposed surface, and imparted to the air, and conducted off, in the usual way, through the chamber M and pipes K.

We believe we have thus shown the nature, construction, and advantage of this invention so as to enable a person skilled in the art to make and use the same therefrom.

What we claim, and desire to secure by Letters Patent, is—

1. The plate E, or its equivalent, whereby we are enabled to form an equalized draught-space, E.

2. The central orifice C, in combination with draught-space F.

3. The combination of the inner wall D′, top and bottom plates B B′, tubes I, plate E, or its equivalent, with the fire-pot G.

4. The exit-pipe H, passing through and in combination with the air-box A.

ALLEN & WILLARD. L. S.]

Witnesses:

E. W. Bliss,
Jeremy W. Bliss.